(12) United States Patent
Miyazaki et al.

(10) Patent No.: US 6,808,468 B1
(45) Date of Patent: Oct. 26, 2004

(54) COMPOSITE POWER TRANSMISSION MECHANISM AND VEHICLE

(75) Inventors: Taizo Miyazaki, Hitachi (JP); Tomoyuki Haniu, Yokosuka (JP); Ryoso Masaki, Hitachi (JP); Masahiko Amano, Hitachiohta (JP); Yasuo Morooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/239,892

(22) PCT Filed: May 8, 2000

(86) PCT No.: PCT/JP00/02923

§ 371 (c)(1),
(2), (4) Date: Sep. 26, 2002

(87) PCT Pub. No.: WO01/85483

PCT Pub. Date: Nov. 15, 2001

(51) Int. Cl.[7] .............................................. F16H 37/06
(52) U.S. Cl. .............................. 475/1; 475/5; 475/329; 475/339
(58) Field of Search ............................... 475/1, 5, 329, 475/338, 339, 340, 341, 342

(56) References Cited

U.S. PATENT DOCUMENTS

| | | | | |
|---|---|---|---|---|
| 3,156,136 A | * | 11/1964 | Sogabe | 475/339 |
| 4,142,426 A | * | 3/1979 | Baranyi | 475/340 |
| 5,540,629 A | * | 7/1996 | Gotman | 475/338 X |
| 5,947,858 A | * | 9/1999 | Williams | 475/339 X |
| 5,980,410 A | | 11/1999 | Stemler et al. | |
| 6,371,882 B1 | * | 4/2002 | Casey et al. | 477/5 |
| 6,595,884 B1 | * | 7/2003 | Ai et al. | 475/5 |

FOREIGN PATENT DOCUMENTS

| | | | | |
|---|---|---|---|---|
| EP | 0967102 A2 | | 12/1999 | |
| EP | 0967103 A2 | | 12/1999 | |
| JP | 50-85019 | | 7/1975 | |
| JP | 361006447 | * | 1/1986 | 475/1 |
| JP | 9-14385 | | 1/1997 | |
| JP | 2000-16101 | | 1/2000 | |

OTHER PUBLICATIONS

English translation of Japanese publication JP 50–85019 (20 pages).
English abstract of Japanese publication JP 9-14385.
English abstract of Japanese publication JP 2000–16101.

* cited by examiner

Primary Examiner—Ha Ho
(74) Attorney, Agent, or Firm—Crowell & Moring LLP

(57) ABSTRACT

A composite power transmission mechanism 10, comprising the combination of a planetary gear unit 15 and a differential planetary gear mechanism 16, wherein a planetary gear is connected with a drive shaft of a vehicle, while other three gears let the shafts of the motor 12, a motor 13 and an engine 11 rotate respectively. The drive shaft of the vehicle is made to rotate by means of the planetary gear of the composite power transmission mechanism; since the rotation of different sources of a driving force, i.e., those of the motor 12, the motor 13 and the engine 11, can be transmitted to one another by only one meshing of the gears, the mechanical loss that is dependent on the number of times of the meshing of the gears can be reduced to a minimum.

16 Claims, 6 Drawing Sheets

(a) SKELETON DIAGRAM (b) COLLINEAR DIAGRAM (a) rs<rq (b) rs>rq (a) SKELETON DIAGRAM OF 4-SHAFT DIFFERENTIAL GEAR MECHANISM (b) COLLINEAR DIAGRAM OF PLANETARY GEAR MECHANISM (c) COLLINEAR DIAGRAM OF DIFFERENTIAL PLANETARY GEAR MECHANISM (d) COLLINEAR DIAGRAM OF THE WHOLE GEAR MECHANISM (a) CONSTITUTION 1

(b) CONSTITUTION 2

(c) CONSTITUTION 3

(d) CONSTITUTION 4

(e) CONSTITUTION 5

(f) CONSTITUTION 6

COMPOSITE POWER TRANSMISSION MECHANISM AND VEHICLE

TECHNICAL FIELD

The present invention relates to a power transmission mechanism for a vehicle, and more particularly to a power transmission mechanism which is suitable for the composition or distribution of the power obtained from a plurality of power generators, and to a vehicle provided with such power transmission mechanism.

BACKGROUND ART

Recently, the hybrid vehicle mounted with both an internal combustion engine and an electric motor is coming to attract the public attention. Although the hybrid vehicle is available in various forms, a first prior art is one designed to distribute the mechanical power produced by an internal combustion engine by means of a differential gear mechanism. An example of the differential gear mechanism includes the planetary gear mechanism, which comprises three input gears, namely the sun gear, the carrier and the ring gear; it is characteristic, however, that the number of revolution of one shaft serves as a weighted additional factor to the number of revolution of each of two other shafts. Where it is designed that the traveling speed of a vehicle is defined by the primary combination of the number of revolution of an engine and the number of revolution of an electric motor, it becomes possible to let an engine operate at the optimal number of revolution at all times, regardless of the traveling speed of a vehicle, by controlling the number of the revolution of an electric motor. This example is disclosed in Japanese Patent Laid-Open No. 7-336810. The scheme disclosed is advantageous in that the size of a vehicle can be made compact as a hybrid vehicle because the mechanical speed change gear can be omitted.

Besides the above prior art, there is a second prior art disclosed by Japanese Patent Laid-Open No. 11-301291. This prior art relates to a speed change gear designed for distributing the energy of the driving power source among a plurality of differential gear mechanisms, as well as for synthesizing the energies outputted from a plurality of electric motors, respectively connected with the plurality of differential gear mechanisms, and those outputted from the plurality of differential gear mechanisms. This art, when compared with the first prior art, provides a wider speed change range where the size of the electric motor is fixed. This provides an advantage that the performance of the vehicle can be improved.

On the other hand, however, this prior art gives rise to a problem that the vehicle drive mechanism using a plurality of differential gears is accompanied by the increase in the number of times of gear meshing operation and resulting increase in the mechanical loss. A first object of the present invention is to control the mechanical loss of a vehicle having a plurality of differential gears to a minimum.

Incidentally, as discussed previously, the planetary gear has the characteristic suitable for the use on the hybrid vehicle. However, in general, it is difficult to satisfy the conditions for obtaining a desired gear ratio of the planetary gear mechanism and thus it is not always possible to obtain the desired gear ratio. A second object of the present invention is to realize a power transmission mechanism having a design freedom that is wide enough to provide a desired gear ratio and applicable to the hybrid vehicle with an electric speed change mechanism having a wide speed change range.

DISCLOSURE OF INVENTION

The present invention provides a vehicle provided with a composite power transmission mechanism, said mechanism including: a first shaft that is rotated by a planetary gear; and second, third, and fourth shafts that are rotated respectively by gears directly meshing with the planetary gear; wherein the first shaft is connected with a driving shaft of the vehicle; the second shaft is connected with an engine; and the third shaft and the fourth shaft are connected respectively with an electric rotary machine.

The driving shaft of the vehicle is made to revolve by means of the planetary gear of the composite power transmission mechanism, and the planetary gear is capable of transmitting the power of respective driving power sources, i.e., the electric rotary machine and the engine to each other, when the gears are meshed once with one another, so that the mechanical loss resulting from the meshing of the gears can be controlled to a minimum.

Further, the present invention provides a composite power transmission mechanism for a vehicle including at least three mechanical power generators and corresponding output shafts, wherein the composite power transmission mechanism includes a sun gear A, a sun gear B, a revolution gear A, a revolution gear B and an internal gear; the sun gear A, the revolution gear A and the internal gear A constitute a planetary gear mechanism; the revolution gear B is connected with the revolution gear A so as to rotate about its own axis and to revolve at the same speed as the revolution gear A; the revolution gear B meshes with the sun gear B: the sun gear A, the sun gear B and the internal gear are connected respectively with the mechanical power generator either directly or through a mechanical power transmission mechanism; and a carrier of the planetary gear mechanism and the output shaft are connected with each other either directly or through the mechanical power transmission mechanism.

The present invention provides a composite power transmission mechanism for a vehicle including at least three mechanical power generators and corresponding output shafts, wherein the composite power transmission mechanism includes a sun gear A, a sun gear B, a sun gear C, a revolution gear A, a revolution gear B, a revolution gear C and a carrier; the sun gear A meshes with the revolution gear A: the sun gear B meshes with the revolution gear B; the sun gear C meshes with the revolution gear C; the revolution gear A, the revolution gear B and the revolution gear C are connected with one another so as to rotate about their own axes at the same speed; the carrier holds the revolution gear A, the revolution gear B and the revolution gear C so as to enable these gears to revolve at the same speed; the sun gear A, the sun gear B and the sun gear C are connected respectively with the mechanical power generator; and the carrier is connected with the output shaft either directly or through a mechanical power transmission mechanism.

The present invention provides a composite power transmission mechanism for a vehicle including at least three mechanical power generators and corresponding output shafts, wherein the composite power transmission mechanism includes a sun gear A, a sun gear B, a sun gear C, a revolution gear A, a revolution gear B, a revolution gear C, an intermediary revolution gear and a carrier; the sun gear A meshes with the revolution gear A; the sun gear B meshes with the revolution gear B; the sun gear C meshes with the revolution gear C through the intermediary revolution gear; the revolution gear A, the revolution gear B and the revolution gear C are connected with one another so as to rotate about their own axes at the same speed; the carrier holds the revolution gear A, the revolution gear B, the revolution gear C and the intermediary gear so as to enable these gears to revolve at the same speed; the sun gear A, the sun gear B and the sun gear C are connected respectively with the mechanical power generator either directly or through a mechanical power transmission mechanism; and the carrier is connected with the output shaft either directly or through the mechanical power transmission mechanism.

The present invention provides a composite power transmission mechanism for a vehicle including at least three mechanical power generators and corresponding output shafts, wherein the composite power transmission mechanism includes a sun gear A, a sun gear B, a revolution gear A, a revolution gear B, an intermediary revolution gear and an internal gear; the sun gear A, the revolution gear A, the intermediary gear and the internal gear constitute a double pinion planetary gear mechanism; the composite power transmission mechanism includes the revolution gear B that is connected with the revolution gear A so as to rotate about its own axis and to revolve at the same speed as the revolution gear A; the revolution gear B meshes with the sun gear B; the sun gear A, the sun gear B and the internal gear are connected respectively with the mechanical power generator either directly or through a mechanical power transmission mechanism; a carrier of the double pinion planetary gear mechanism is connected with the output shaft either directly or through the mechanical power transmission mechanism.

The present invention provides a composite power transmission mechanism including at least three mechanical power generators and corresponding output shafts, wherein the composite power transmission mechanism includes a sun gear A, a sun gear B, a revolution gear A, a revolution gear B, an intermediary revolution gear A, an intermediary revolution gear B and an internal gear; the sun gear A, the revolution gear A, the intermediary revolution gear and the internal gear constitute a double pinion planetary gear mechanism; the composite power transmission mechanism includes the revolution gear B that is connected with the revolution gear A so as to rotate about its own axis and to revolve at the same speed as the revolution gear A; the revolution gear B meshes with the sun gear B through the intermediary revolution gear B; the sun gear A, the sun gear B and the internal gear are connected respectively with the mechanical power generator either directly or through a mechanical power transmission mechanism; and a carrier of the double pinion planetary gear mechanism is connected with the output shaft either directly or through the mechanical power transmission mechanism.

The present invention provides, in a composite power transmission mechanism including at least three mechanical power generators and corresponding mechanical output shafts, wherein the rotating speed, $\omega i$ (i=1, 2, ...), of each of the mechanical power generators is expressed as $\omega i = kei \cdot \omega e + kvi \cdot \omega v$ (i=1, 2, ...; kei ? 0; kvi ? 0) where $\omega e$ = the rotating speed of each mechanical power generator and $\omega v$ = the rotating speed of each of the mechanical output shafts, composite power transmission means in which the composite power transmission mechanism includes a sun gear A, a sun gear B, a revolution gear A, a revolution gear B and a carrier; the revolution gear A and the revolution gear B rotate about their own axes at the same speed; the revolution gear A and the revolution gear B are connected respectively with the carrier so as to revolve at the same speed; and the revolution gear A meshes with the sun gear A; and the revolution gear B meshes with the sun gear B.

BEST MODE FOR CARRYING OUT THE INVENTION

Embodiments of the present invention will be described below.

Figure 1:
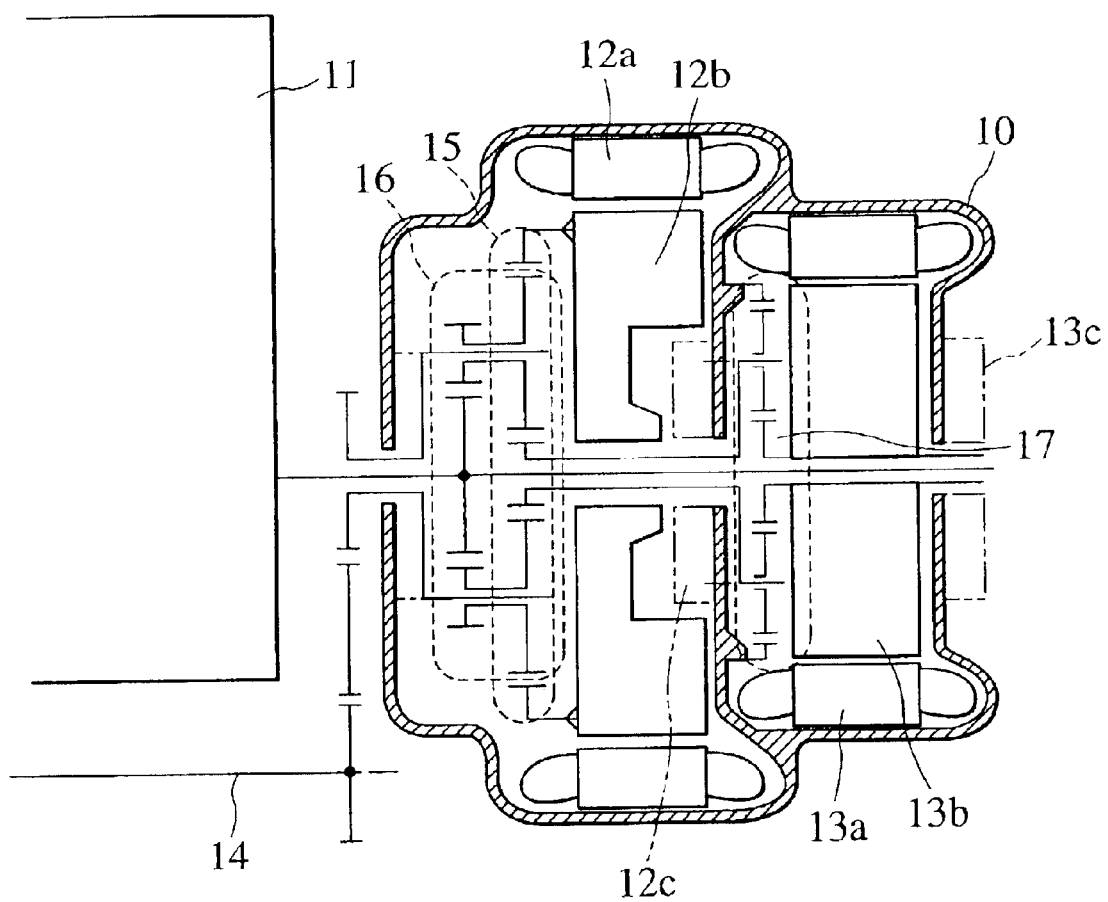
FIG. 1 shows a composite power transmission apparatus according to an embodiment of the present invention.

FIG. 1 shows a composite power transmission apparatus according to an embodiment of the present invention. For easier visual observation of the meshing among the gears and the like, a skeleton diagram is used. In this diagram, reference numeral 10 represents a composite power transmission mechanism, and 11, an engine; 12a represents a stator of an electric motor A; 12b, a rotor of the electric motor A; 12c, a rotor position detector for the electric motor A. When a DC motor is used as the electric motor A, or when the position-sensor-less control method is adopted, the rotor position detector 12c for the electric motor A may be omitted. Reference character 13a represents a stator of an electric motor B; 13b, a rotor of the electric motor B; 13c, a rotor position detector of the electric motor B. Further, similarly to the case of the electric motor A, in the case of the electric motor B, the rotor position detector 13c may be omitted.

The composite power transmission mechanism 10 is primarily designed for being mounted on the vehicle and assuming an engine 11 as being a main power source. Reference numeral 14 represents an output shaft that is connected with wheels (not shown) to drive a vehicle. The composite power transmission mechanism 10 provides the speed changing operation, the engine starting function, the torque assisting function or the like by properly controlling the number of revolution and the driving torque of the electric motors A 12 and B 13. Reference numeral 15 represents the planetary gear unit and 16, the differential planetary gear unit, which constitute the composite power transmission mechanism 10 according to the present invention. The fashions of connection and the functions of the planetary gear unit 15 and the differential planetary gear unit 16 will be described later. Further, reference numeral 17 represents a reduction gear which is realized by means of the planetary gear mechanism. In the case given in FIG. 1, for compactness, the stator 13a having a relatively small diameter is disposed inside the stator 12a of the electric motor A. Further, from the similar reason, the planetary gear unit 15 is disposed inside the stator 12a of the electric motor A, while the position detector 12c of the electric motor A is disposed inside the rotor 12b of the electric motor A. Further, the rotating shaft of the engine extends through the composite power transmission mechanism 10 in order to ensure the desired strength and the centering accuracy thereof.

FIG. 2A is a skeleton diagram of the differential planetary gear unit 16, and FIG. 2B is a collinear diagram of the former. Further, symbol S represents a sun gear A; Q, a sun gear B; C, a carrier. Further, symbol E represents the rotating shaft of the engine 11; V, an output shaft 14; B', a rotating shaft of the electric motor B13 whose speed is to be reduced by the reduction gear 17. In FIG. 2A, reference numeral 21 represents the sun gear A; 22, a revolution gear A; 23, a revolution gear B; 24, a revolution gear holder; 25, the sun gear B. Further, the revolution gear A 22 and the revolution gear B 23 have a common rotating shaft, the common rotating shaft being attached to the revolution gear holder 24 so as to rotate around the rotating shaft of the revolution gear holder 24.

Given that the radius of the sun gear A 21 is rs; the radius of the revolution gear A 22, as rp1; the radius of the revolution gear B 23, as rp2; the distance from the rotating shaft of the revolution gear holder 24 to the rotating shaft of the revolution gear A 22 and the rotating shaft of the revolution gear B 23, as rc respectively; the radius of the sun gear B 25, as rq; the rotating speed of the sun gear A 21, as $\omega s$; the rotating speed of the revolution gear holder 24, as $\omega c$; and the rotating speed of the sun gear B 25, as $\omega q$; the relationships given below holds among the revolving speeds.

$$\omega c = -\beta \omega s + (1+\beta) \omega q \quad (1),$$

provided that $$\beta = rs \cdot rp2/(rp \cdot rp1 - rs \cdot rp2) \quad (2)$$

The above relationships in collinear expression are as given in FIG. 2B.

The planetary gear mechanism is known as a mechanical means for realizing the conditions represented by the collinear diagram similar to one given in FIG. 2B. For comparison with the differential planetary gear mechanism, the relationship among different numbers of rotation of the shafts can be given by the following expression:

$$\omega c = \alpha \omega s + (1-\alpha) \omega r \quad (3),$$

provided that $$\alpha = rs/(rs+rr) \quad (4)$$

where the radius of the sun gear is given as rs; the radius of the ring gear, as rr; the number of rotation of the sun gear, as $\omega s$; the number of rotation of the carrier, as $\omega c$; and the number of rotation of the ring gear, as $\omega r$.

In general, the planetary gear mechanism is advantageous in that large gear ratios can be realized easily with a relatively compact gear mechanism, but the planetary gear system has some geometrical limitations, for instance, with respect to the conditions for the central gear, the conditions for meshing, the conditions for external form and the like, so that it is difficult to freely set the gear ratios among various rotating shafts. Further, since rs <rr structurally, the value of a can be taken only within the range of 0–0.5 at the most. The range of a becomes smaller when the limiting conditions due to the external form are taken into account.

The composite power transmission mechanism 10 according to the present invention includes a differential planetary gear mechanism as is given in FIG. 2A in order to reduce the problems mentioned in the above. This arrangement is less subject to the geometrical limitations than that using the planetary gear mechanism, thereby providing a greater design freedom. For instance, in the case represented by Eq. (2), when the parameter k, as is defined by Eq. (3) given below, is used, the range of the value that can be taken for $\beta$ in Eqs. (1) and (2) will be as given in FIG. 3.

$$k = rs \cdot rp2/(rq \cdot rp1) \quad (5)$$

Figure 2:
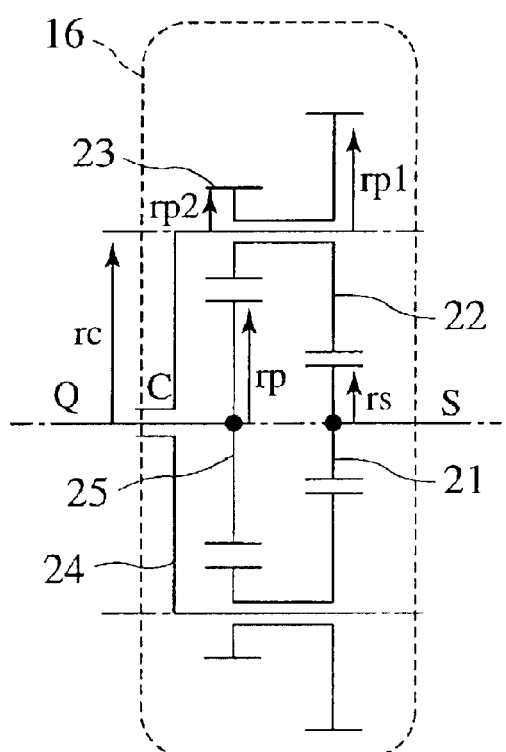
FIG. 2 is a diagram illustrating a differential planetary gear mechanism.
Figure 2:
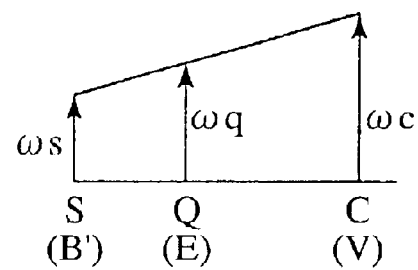
Figure 3:
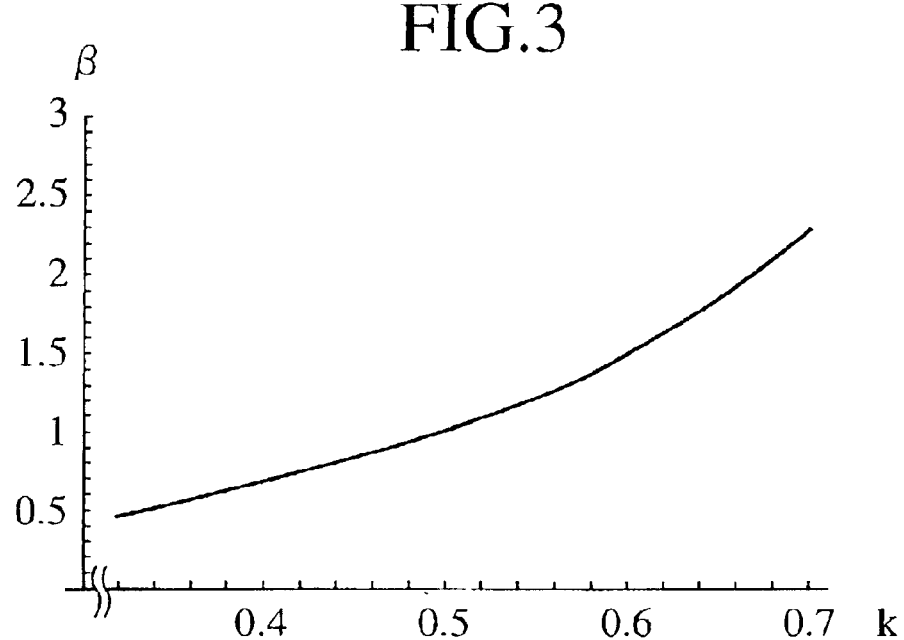
FIG. 3 is a graphic diagram showing gear ratios available for the differential planetary gear mechanism.
Figure 3:
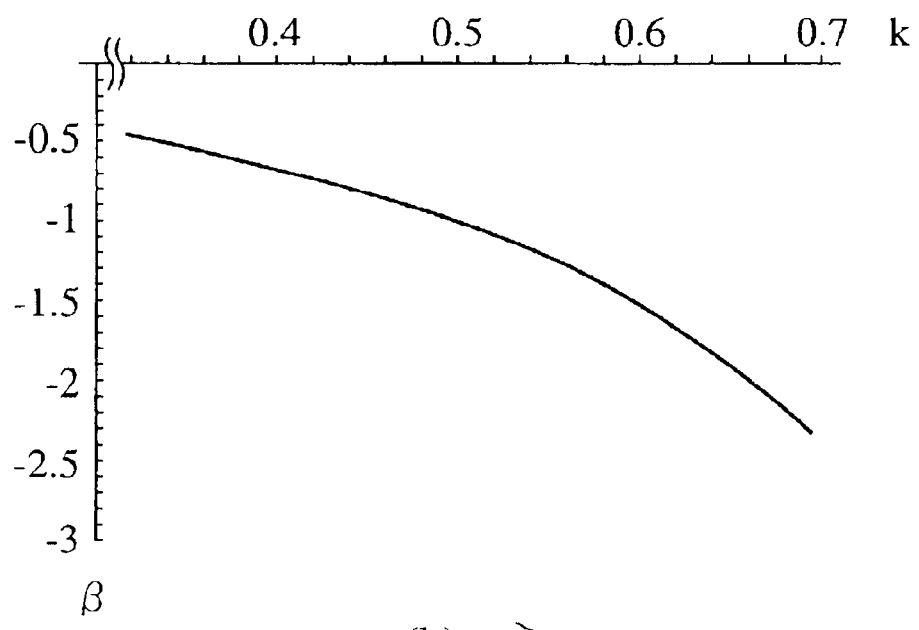

As seen from FIG. 3, the differential planetary gear mechanism shown in FIG. 2 enables the value of the design constant $\beta$ to be varied largely relative to the design constant $\alpha$ in the case of the planetary gear mechanism. Therefore, in designing the composite power transmission mechanism, it is possible to select either the planetary gear mechanism or the differential planetary gear mechanism depending on the given design values, thereby enabling optimal gear ratios to be provided with a relatively simple mechanism. This enables us to expect the effects such as the reduction in the number of necessary gears, the resultant reduction of the mechanical loss, and further compactness of the mechanical system.

Figure 4:
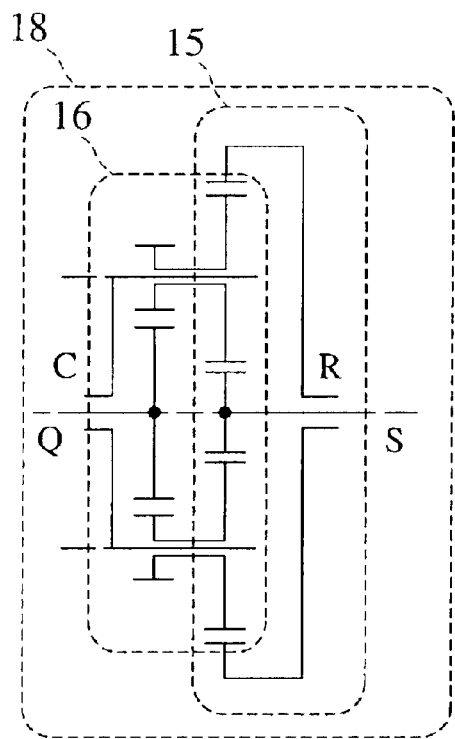
FIG. 4 is a diagram illustrating a 4-shaft differential gear mechanism.
Figure 4:
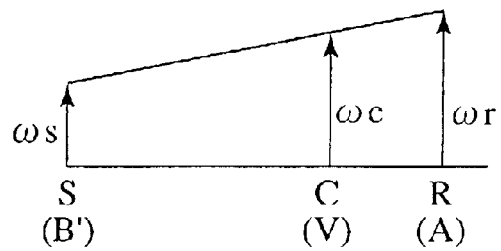
Figure 4:
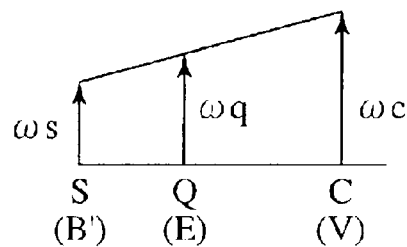
Figure 4:
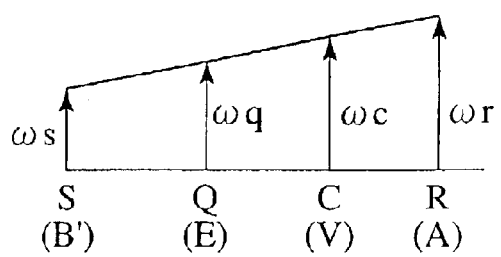

The mechanical elements constituting the composite power transmission mechanism according to an embodiment of the present invention is given in FIG. 4A. This embodiment includes four rotating shafts, i.e., those of the engine 11, the electric motor A 12, the electric motor B 13, and the output shaft 14, and thus a 4-shaft differential gear mechanism 18 is realized by combining the planetary gear unit 15 and the differential planetary gear unit 16. In this embodiment, the revolution gear of the planetary gear unit 15 and the revolution gear of the differential planetary gear unit 16 are connected with each other through a rigid body and are not only rotated at the same speed but also held by a common carrier. Further, with respect to this embodiment, the collinear diagram of the planetary gear unit 15 is shown in FIG. 4B; the collinear diagram of the differential planetary gear unit 16, in FIG. 4C; the collinear diagram showing the combination of the FIG. 4B and FIG. 4B is shown in FIG. 4D. In this diagram, symbol R represents the ring gear, while A represents the rotating shaft of the electric motor A 12.

As seen from FIG. 4D, in the case of the present mechanism, when the rotating speeds of any two, out of the shaft and the output shaft of the engine, the rotating shaft of the electric motor A and the rotating shaft of the electric motor B, are determined, the rotating speeds of the remaining two are determined automatically. This relationship can be expressed by Eq. (6) given below.

$$\omega i = kei \cdot \omega e + kvi \cdot \omega v (i=1, 2, \ldots kei \neq 0; kvi \neq 0) \quad (6)$$

where $\omega e$=number of revolutions of the engine; $\omega v$=number of rotation of the output shaft; $\omega i$=numbers of revolutions of the remaining rotating shafts. In order to generalize what is discussed above, i is assumed to be natural numbers of 2 or more; however, in the case of the composite power transmission mechanism given in FIG. 1, i is 1 or 2, which represent the numbers of revolution of the electric motor A 12 and the electric motor B 13 respectively. Further, in this case, the conditions that kei ≠ 0 and kvi ≠ 0, are given, and these conditions are given because of the fact that the present invention relates to the composite power transmission mechanism that requires the combination of the planetary gear mechanism and the differential gear planetary gear mechanism. For instance, in this embodiment, when the conditions, ke1=0 and $\omega 1 = \omega a$ (the number of rotation of the rotating shaft of the electric motor A 12), are given, it follows that $\omega a = kv1 \cdot \omega v$, so that the immediately preceding equation holds when the rotating shaft and the output shaft of the electric motor A are connected with each other through a spur gear. In this case, the composite power transmission mechanism can be obtained, for example, only with a set of planetary gear mechanism and thus do not require combination with the differential gear mechanism like the case of the present invention.

As discussed previously, in the case of the arrangement such as one given in FIG. 1, when the numbers of rotation of any two out of the engine 11, the electric motor A 12, the electric motor B 13, and the output shaft 14 are determined, the numbers of rotation of the remaining two are determined automatically. In this case, however, it is necessary to differentiate the numbers of rotation of the two in order to determine the numbers of rotation of the remainders. This can be realized by using two or more differential mechanisms. Such a characteristic not only enables the electric motor to be operated at the number of rotation differing substantially from the number of revolution of the engine and the number of rotation of the output shaft but also is convenient for the electric motor in increasing the number of its rotation, decreasing its torque and decreasing its operational loss. On the other hand, however, the performance of the vehicle becomes largely dependent on the selection of the gear ratios, thereby making it essential to use the differential gear mechanism allowing a wide range of freedom in selecting the gear ratio.

The present invention is made to fill the needs discussed in the above. As shown in FIG. 3, the differential planetary gear mechanism has a greater gear ratio setting freedom than the differential gear mechanism wherein the gear ratio setting freedom is dependent on the planetary gears, and so in the case of the differential planetary gear mechanism, the parameter β can be set with relatively greater freedom according to the requirements of the vehicle or the electric motor. Further, as discussed previously, since the planetary gear mechanism is suitable for the formation of the mechanism having large gear ratios, they are preferable to be used selectively according to the characteristic of the vehicle.

Another feature of the present invention is that the output shaft is connected with the carrier of the differential gear mechanism. The 4-shaft differential gear mechanism according to the present invention is designed to be capable of transmitting the torque of any rotating shaft to the carrier through only one meshing between the gears. This means that, when taking the power through the output shaft 14, the power can be supplied at the cost of only one meshing between the gears, regardless of the sources of the power such as the engine 11, the electric motor A 12 and the electric motor B 13. This enables the composite power transmission mechanism to be realized with a small mechanical loss.

Figure 5:
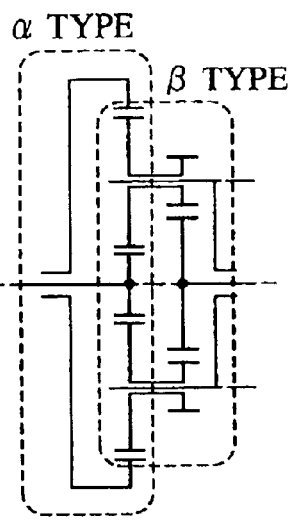
FIG. 5 is a diagram illustrating an effective gear arrangement.
Figure 5:
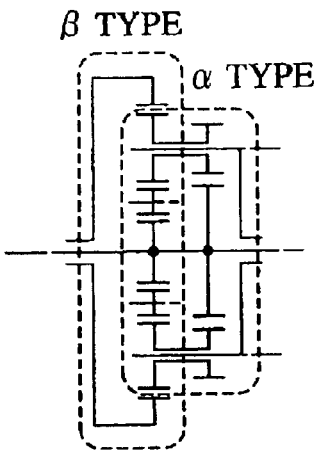
Figure 5:
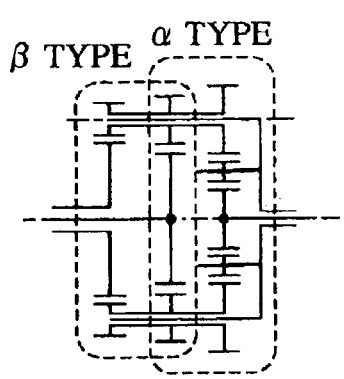
Figure 5:
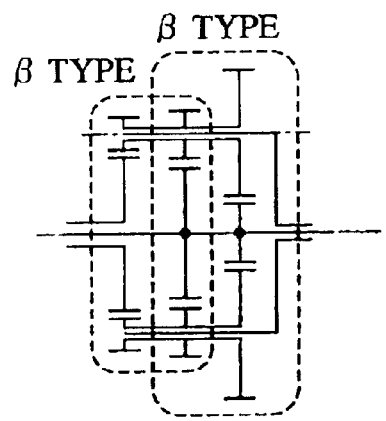
Figure 5:
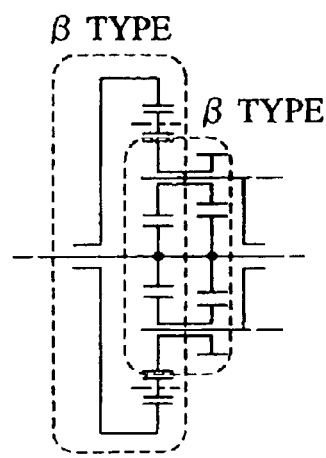
Figure 5:
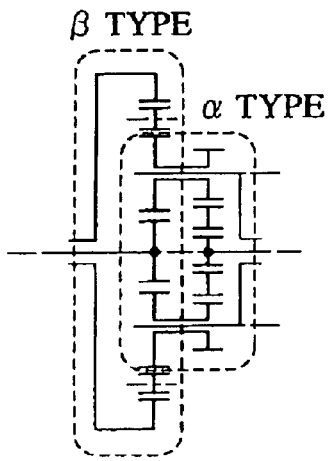

The mechanism comprising the differential planetary gear mechanism has been discussed in the foregoing, but a double pinion planetary gear mechanism may be substituted. The double pinion planetary gear mechanism comprises a first revolution gear meshing with a sun gear and a second revolution gear meshing with an internal gear, the first revolution gear and the second revolution gear being respectively held in holders so as to rotate at the same revolving speed, so that the first revolution gear and the second revolution gear mesh with each other. This mechanism, although having a problem that its size structurally tends to increase in radial direction, produces the effect similar to that of the differential planetary gear mechanism. The arrangements of the gears designed for realizing the objects of the present invention are collectively shown in FIG. 5. The units of the gear mechanisms whose characteristics are determined by Eq. (3) and Eq. (4) are called the α type units while those whose characteristics are determined by Eq. (1) and Eq. (2) are called the β type units. FIG. 5A shows the 4-shaft differential gear mechanism shown in FIG. 1. As mentioned previously, a wide design freedom is required in designing the composite power transmission mechanism, and so it is desirable for the mechanism to include the β type unit.

Figure 6:
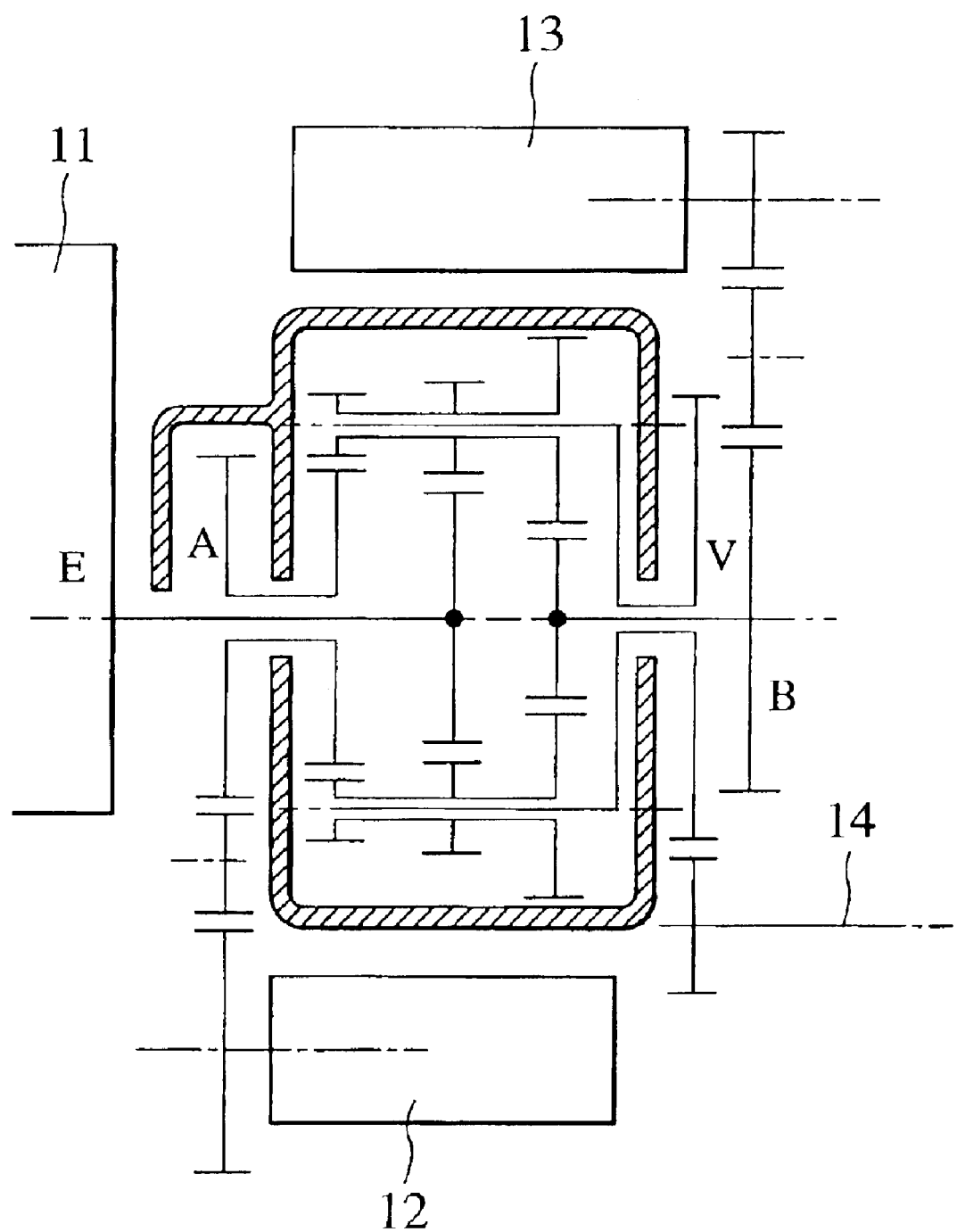
FIG. 6 shows another embodiment of the present invention.

FIG. 6 shows another embodiment of the present invention. Here, an example of the 4-shaft differential gear mechanism as is shown in FIG. 5C is discussed. The feature of the present embodiment lies in that the diameter of the 4-shaft differential gear mechanism is reduced so that even if an ordinary electric motor is installed in parallel with the 4-shaft differential gear mechanism, satisfactory mounting characteristics are assured. Further, in the embodiment shown in FIG. 6, the electric motor A 12 may be installed coaxially with the rotating shaft of the engine 11 so that the 4-shaft differential gear mechanism can be disposed inside the electric motor A12.

Industrial Applicability

The present invention relates to a composite power transmission mechanism for the vehicle comprising at least three mechanical power generators and corresponding output shafts and designed for being capable of freely varying the ratio between the number of revolution of the engine and the number of revolution of the wheel shaft.

Such mechanism, however, when combined with the conventional gear mechanism, gives rise to a problem such that the number of meshing among the gears increase, causing the increase in mechanical loss and the increase in the size of the mechanism. However, according to the present invention, the basic part of such mechanism can easily be realized to thereby enable the overall size of the mechanism and the mechanical loss to be reduced.

What is claimed is:

1. A composite power transmission mechanism for a vehicle including at least three mechanical power generators;
   wherein the composite power transmission mechanism includes a first sun gear, a second sun gear, a third sun gear, a first revolution gear, a second revolution gear, a third revolution gear and a carrier;
   wherein the first sun gear meshes with the first revolution gear, the second sun gear meshes with the second revolution gear, and the third sun gear meshes with the third revolution gear;
   wherein the first revolution gear, the second revolution gear and the third revolution gear are connected with one another so as to rotate about their own axes at the same speed;
   wherein the carrier holds the first revolution gear, the second revolution gear and the third revolution gear so as to enable these gears to revolve at the same speed;
   wherein the first sun gear, the second sun gear and the third sun gear are connected respectively with the mechanical power generators; and
   wherein the carrier is connected with an output shaft either directly or through a mechanical power transmission mechanism.

2. A composite power transmission mechanism for a vehicle including at least three mechanical power generators;
   wherein the composite power transmission mechanism includes a first sun gear, a second sun gear, a third sun gear, a first revolution gear, a second revolution gear, a third revolution gear, an intermediary revolution gear and a carrier;
   wherein the first sun gear meshes with the first revolution gear, the second sun gear meshes with the second revolution gear, and the third sun gear meshes with the third revolution gear through the intermediary revolution gear;
   wherein the first revolution gear, the second revolution gear and the third revolution gear are connected with one another so as to rotate about their own axes at the same speed;

wherein the carrier holds the first revolution gear, the second revolution gear, the third revolution gear and the intermediary gear so as to enable these gears to revolve at the same speed;

wherein the first sun gear, the second sun gear and the third sun gear are connected respectively with the mechanical power generators either directly or through a mechanical power transmission mechanism; and wherein the carrier is connected with an output shaft either directly or through the mechanical power transmission mechanism.

3. The composite power transmission mechanism according to claim 1 or claim 2, wherein the composite power transmission mechanism includes an electric motor disposed on a rotating shaft, the electric motor is connected with the rotating shaft, and the composite power transmission mechanism includes gears to constitute the composite power transmission mechanism inside the electric motor.

4. The composite power transmission mechanism according to claim 3, wherein a position detector of the electric motor is provided inside the electric motor.

5. The composite power transmission mechanism according to claim 1 or claim 2, wherein the composite power transmission mechanism includes two or more electric motors, and one of the electric motors has a diameter which is smaller than that of at least one other of the electric motors and is partially disposed inside the at least one other of the electric motors.

6. The composite power transmission mechanism according to claim 3, wherein the rotating shaft, which is connected with one of the mechanical power generators which generates the largest torque of all, extends through the composite power transmission mechanism.

7. The composite power transmission mechanism according to claim 4, wherein the rotating shaft, which is connected with one of the mechanical power generators which generates the largest torque of all, extends through the composite power transmission mechanism.

8. The composite power transmission mechanism according to claim 5, wherein a rotating shaft, which is connected with one of the mechanical power generators which generates the largest torque of all, extends through the composite power transmission mechanism.

9. A vehicle including the composite power transmission mechanism according to claim 1.

10. A vehicle including the composite power transmission mechanism according to claim 2.

11. A vehicle including the composite power transmission mechanism according to claim 3.

12. A vehicle including the composite power transmission mechanism according to claim 4.

13. A vehicle including the composite power transmission mechanism according to claim 5.

14. A vehicle including the composite power transmission mechanism according to claim 6.

15. A vehicle including the composite power transmission mechanism according to claim 7.

16. A vehicle including the composite power transmission mechanism according to claim 8.

* * * * *